US007787145B2

(12) United States Patent
Robertson et al.

(10) Patent No.: US 7,787,145 B2
(45) Date of Patent: Aug. 31, 2010

(54) METHODS FOR IMPROVING PRINT QUALITY IN A HAND-HELD PRINTER

(75) Inventors: Douglas Laurence Robertson, Crestwood, KY (US); Barry Baxter Stout, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 1098 days.

(21) Appl. No.: 11/427,484

(22) Filed: Jun. 29, 2006

(65) Prior Publication Data

US 2008/0007762 A1 Jan. 10, 2008

(51) Int. Cl.
*G06F 15/00* (2006.01)
*G06F 3/12* (2006.01)
*G06K 1/00* (2006.01)

(52) U.S. Cl. ......................... 358/1.5; 358/1.1; 358/1.12

(58) Field of Classification Search .................. 358/1.1, 358/1.9, 1.11–1.18, 1.5
See application file for complete search history.

(56) References Cited

U.S. PATENT DOCUMENTS 4,675,700 A 6/1987 Nagira et al.
4,758,849 A 7/1988 Piatt et al.
4,915,027 A 4/1990 Ishibashi et al.
4,933,867 A 6/1990 Ishigaki
4,947,262 A 8/1990 Yajima et al.
4,949,391 A 8/1990 Faulkerson et al.
4,999,016 A 3/1991 Suzuki et al.
5,013,895 A 5/1991 Iggulden et al.
5,024,541 A 6/1991 Tsukada et al.
5,028,934 A 7/1991 Kasai et al.
5,052,832 A 10/1991 Akiyama et al.
5,063,451 A 11/1991 Yanagisawa et al.
5,093,675 A 3/1992 Koumura et al.
5,110,226 A 5/1992 Sherman et al.
5,111,216 A 5/1992 Richardson et al.
5,149,980 A 9/1992 Ertel et al.
5,160,943 A 11/1992 Pettigrew et al.
5,184,907 A 2/1993 Hamada et al.
5,186,558 A 2/1993 Sherman et al.
5,188,464 A 2/1993 Aaron
5,236,265 A 8/1993 Saito et al.
5,240,334 A 8/1993 Epstein et al.
5,262,804 A 11/1993 Petigrew et al.
5,267,800 A 12/1993 Petteruti et al.
5,308,173 A 5/1994 Amano et al.
5,311,208 A 5/1994 Burger et al.
5,312,196 A 5/1994 Hock et al.
5,344,248 A 9/1994 Schoon et al.
5,355,146 A 10/1994 Chiu et al.

(Continued)

FOREIGN PATENT DOCUMENTS

SE 103334 10/1941

(Continued)

*Primary Examiner*—Thierry L Pham

(57) ABSTRACT

Method for determining enhanced printing functions on a hand-held inkjet printer having one or more optical sensors configured to measure speed and distance across the page. Collecting a first frame of individual pixel data, mapping the first frame of individual pixel data into a pixel map memory, processing the first frame of individual pixel data to perform additional print quality features. These additional features can be categorized in three main categories: 1) sensing non-printing elements, 2) sensing pre-printed elements, and 3) sensing print elements.

7 Claims, 4 Drawing Sheets

U.S. PATENT DOCUMENTS

| | | | |
|---|---|---|---|
| 5,446,559 | A | 8/1995 | Birk |
| 5,449,238 | A | 9/1995 | Pham et al. |
| 5,462,375 | A | 10/1995 | Isobe et al. |
| 5,475,403 | A | 12/1995 | Havlovick et al. |
| 5,503,483 | A | 4/1996 | Etteruti et al. |
| 5,520,470 | A | 5/1996 | Willett |
| 5,578,813 | A | 11/1996 | Allen et al. |
| 5,650,820 | A | 7/1997 | Sekine et al. |
| 5,664,139 | A | 9/1997 | Spurlock |
| 5,685,651 | A | 11/1997 | Hayman et al. |
| 5,686,720 | A | 11/1997 | Tullis |
| 5,729,008 | A | 3/1998 | Blalock et al. |
| 5,786,804 | A | 7/1998 | Gordon |
| 5,806,993 | A | 9/1998 | Petterutti et al. |
| 5,816,718 | A | 10/1998 | Poole |
| 5,825,044 | A | 10/1998 | Allen et al. |
| 5,829,893 | A | 11/1998 | Kinoshita et al. |
| 5,842,793 | A | 12/1998 | Katayama et al. |
| 5,848,849 | A | 12/1998 | Kishi et al. |
| 5,850,243 | A | 12/1998 | Kinoshita et al. |
| 5,853,251 | A | 12/1998 | Imai |
| 5,887,992 | A | 3/1999 | Yamanashi |
| 5,892,523 | A | 4/1999 | Tanaka et al. |
| 5,927,827 | A | 7/1999 | Reuter et al. |
| 5,953,497 | A | 9/1999 | Kokubo et al. |
| 5,984,455 | A | 11/1999 | Anderson |
| 5,997,193 | A | 12/1999 | Petterutti et al. |
| 6,004,053 | A | 12/1999 | Petteruti et al. |
| 6,005,681 | A | 12/1999 | Pollard |
| 6,010,257 | A | 1/2000 | Petteruti et al. |
| 6,017,112 | A | 1/2000 | Anderson et al. |
| 6,026,686 | A | 2/2000 | Hattori et al. |
| 6,076,910 | A | 6/2000 | Anderson |
| 6,158,907 | A | 12/2000 | Silverbrook et al. |
| 6,195,475 | B1 | 2/2001 | Beausoleil, Jr. et al. |
| 6,203,221 | B1 | 3/2001 | Tomasik et al. |
| 6,246,423 | B1 | 6/2001 | Suzuki et al. |
| 6,249,360 | B1 | 6/2001 | Pollard et al. |
| 6,259,826 | B1 | 7/2001 | Pollard et al. |
| 6,270,187 | B1 | 8/2001 | Murcia et al. |
| 6,270,271 | B1 | 8/2001 | Fujiwara |
| 6,338,555 | B1 | 1/2002 | Hirose |
| 6,347,897 | B2 | 2/2002 | Huggins et al. |
| 6,357,939 | B1 * | 3/2002 | Baron ......................... 400/88 |
| 6,373,995 | B1 | 4/2002 | Mioore |
| 6,394,674 | B2 | 5/2002 | Huggins et al. |
| 6,503,005 | B1 | 1/2003 | Cockerill et al. |
| 6,533,476 | B2 | 3/2003 | Hamisch, Jr. et al. |
| 6,553,459 | B1 | 4/2003 | Silverbrook et al. |
| 6,572,290 | B2 | 6/2003 | McCleave et al. |
| 6,604,874 | B2 | 8/2003 | Carriere et al. |
| 6,607,316 | B1 | 8/2003 | Petteruti et al. |
| 6,609,844 | B1 | 8/2003 | Petteruti et al. |
| 6,623,191 | B2 | 9/2003 | Huggins et al. |
| 6,626,597 | B2 | 9/2003 | Fujiwara |
| 6,641,313 | B2 | 11/2003 | Bobry |
| 6,648,528 | B2 | 11/2003 | Hardisty et al. |
| 6,652,090 | B2 | 11/2003 | Silverbrook |
| 6,769,360 | B2 | 8/2004 | Walling |
| 6,846,119 | B2 | 1/2005 | Walling |
| 7,080,785 | B2 * | 7/2006 | Nasu .......................... 235/454 |
| 2001/0019349 | A1 | 9/2001 | Kawakami |
| 2001/0022914 | A1 | 9/2001 | Iura et al. |
| 2001/0024586 | A1 | 9/2001 | Day et al. |
| 2002/0033871 | A1 | 3/2002 | Kaiser |
| 2002/0090241 | A1 | 7/2002 | Fujiwara |
| 2002/0127041 | A1 | 9/2002 | Huggins et al. |
| 2002/0154186 | A1 | 10/2002 | Matsumoto |
| 2003/0031494 | A1 | 2/2003 | Cockerill et al. |
| 2003/0063938 | A1 | 4/2003 | Hardisty et al. |
| 2003/0117456 | A1 | 6/2003 | Silverbrook et al. |
| 2003/0132366 | A1 * | 7/2003 | Gao et al. ................ 250/208.1 |
| 2004/0009024 | A1 | 1/2004 | Hardisty et al. |
| 2004/0014468 | A1 | 1/2004 | Walling |
| 2004/0018035 | A1 | 1/2004 | Petteruti et al. |
| 2005/0018032 | A1 | 1/2005 | Walling |
| 2005/0018033 | A1 | 1/2005 | Walling |
| 2006/0012660 | A1 | 1/2006 | Dagborn |
| 2006/0050131 | A1 | 3/2006 | Breton |
| 2006/0061647 | A1 | 3/2006 | Breton |
| 2006/0165460 | A1 | 7/2006 | Breton |

FOREIGN PATENT DOCUMENTS

| | | | |
|---|---|---|---|
| SE | 522047 | | 1/2004 |
| SE | 527474 | | 3/2006 |
| WO | 2004056576 | A1 | 8/2004 |
| WO | 2004056577 | A1 | 8/2004 |
| WO | 2004088576 | A1 | 10/2004 |
| WO | 2004103712 | A1 | 12/2004 |

* cited by examiner

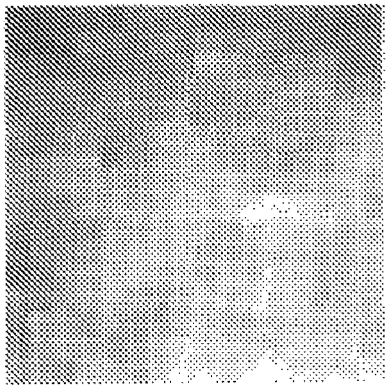
Fig. 4
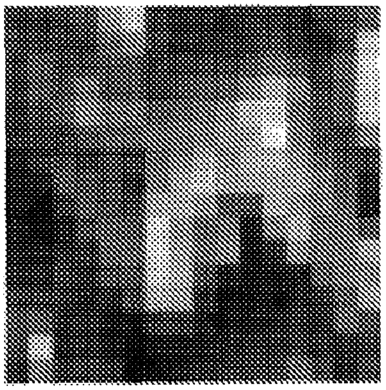
Fig. 5
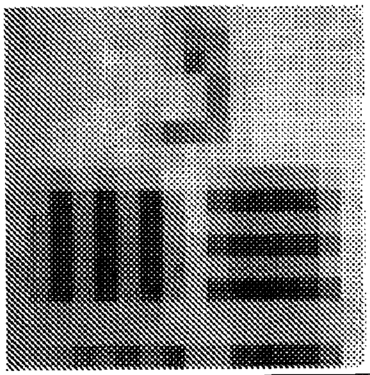
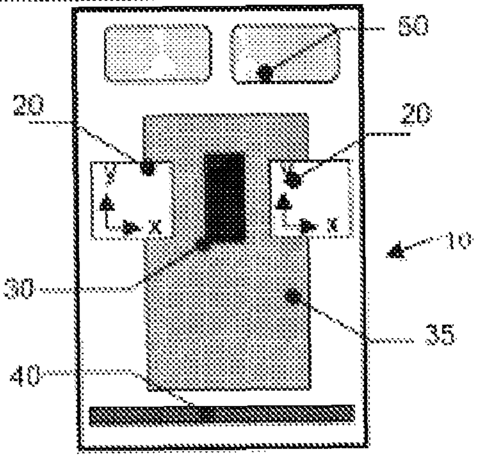
Fig. 9
Fig. 7

METHODS FOR IMPROVING PRINT QUALITY IN A HAND-HELD PRINTER

TECHNICAL FIELD OF THE INVENTION

The present invention relates to methods for improving print quality on a hand-held inkjet printer, and more particularly to methods utilizing one or more optical sensors on the hand-held inkjet printer.

BACKGROUND OF THE INVENTION

Inkjet printing is a conventional technique by which printing is accomplished without contact between the printhead and the medium or substrate on which the desired print characters are deposited. Such printing is accomplished by ejecting ink from an inkjet printhead of a printing apparatus via numerous methods which employ, for example, pressurized nozzles, electrostatic fields, piezo-electric elements and/or heaters for vapor phase droplet formation.

One feature of a hand-held printer is the random motion printing as to compared to a conventional linear-type printer. Most digital printers operate by moving paper under the printing element. This is true for "page printers" which have an active print zone extending across the full width of the paper and true for "serial printers" that also move the print element across the page width in addition to moving the length of the paper by the printing element. This relative movement of paper and print element is the traditional configuration for digital printers. An alternative approach is to fix the position of the paper while the print element is moved over the paper during printing. An example of this alternative approach is a flat bed plotter where the movement of the print element is controlled by fixed mechanical references along and outside the paper edges. The present invention utilizes a printer which is moved manually over the surface of the paper without mechanical linkage and without mechanical control from a fixed reference point. This category of printer is sometimes called a "hand printer" or "random motion printer." One advantage of this category of printer is the potential for compact size which makes it attractive for mobile printing operations.

Because of the effect on resolving print quality, a significant factor in printer design is the accuracy of positioning the print element relative to the paper during the printing process. To increase accuracy, position sensors are often adopted to "close the loop" and confirm location. Such sensors typically detect rotation of paper feed rolls or lateral travel of the carrier for the print element. Without precise sensing, small errors can accumulate until the print quality becomes unacceptable.

In a conventional linear printer, an array of optical sensors are typically utilized to detect movement, printed regions, media type and paper state. However, typical hand-held printers do not include such an array of optical sensors due to size, costs and other technological barriers. In order for the hand-held inkjet printer to be easy to use, the hand-held printer has space limitations and minimal complexity in design. For example, the hand-held printer may include only one or two optical sensors typically utilized for location determination. As such, there is a need for new methods of improving print quality with a hand-held inkjet printer. Accordingly, improved methods of printing are desired.

SUMMARY OF THE INVENTION

The present invention relates to new and improved methods for performing various print quality improvement functions with a hand-held printer utilizing one or more optical sensors.

One aspect of the present invention is a method of detecting missing nozzles on the hand-held inkjet printer. The method comprises collecting a first frame of individual pixel data with the optical sensor when the printhead is located at a first position. An inkjet dot is jetted from a predetermined nozzle on the printhead onto the page while the printhead is located at the first position on the page. A second frame of individual pixel data corresponding to the location of the jetted inkjet dot is collected. The first frame of individual pixel data is compared with the second frame of individual pixel data to determine if the nozzle jetted an inkjet dot. If the nozzle did not jet an inkjet dot, a single can be sent to the user and/or printer to update the status of the nozzle.

Another aspect of the present invention is a method of determining the media type of a page to be printed with a hand-held inkjet printer. The method comprises collecting a first frame of individual pixel data with an optical sensor when the hand-held printer is on the page to be printed. The first frame of individual pixel data is compared with one or more pixel data records to determine the media type of the page to be printed.

Another aspect of the present invention is a method for optimizing swath alignment on a hand-held inkjet printer. The method comprises jetting a first swath from the printhead onto the page, wherein the jetting utilizes a first array of nozzles on the printhead. A first location corresponding to the first swath jetted from the printhead is calculated. An edge of the first swath is detected with the optical sensor and the actual location corresponding to the first swath is calculated. A swath alignment correction factor is determined by comparing the detected actual location of the jetted first swath with the calculated first location of the first swath. A second array of nozzles is selected on the printhead to jet the next swath, wherein the selection is based at least in part on the swath alignment correction factor.

Still yet another aspect of the present invention is a method for determining a print trigger on a media to be printed with a hand-held inkjet printer. The method comprises collecting a frame of individual pixel data with the optical sensor and determining if the frame of individual pixel data corresponds to the print trigger. Upon detection of a print trigger, print instructions corresponding to the print trigger are obtained and utilized.

These methods of the present invention are advantageous for improving print quality of a hand-held inkjet pen. These additional advantages will be apparent in view of the detailed description.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

FIG. 4 is an exemplary illustration of a white paper pixel image map according to one embodiment of the present invention;

FIG. 5 is an exemplary illustration of printed paper pixel image map according to another embodiment of the present invention;

FIG. 7 is a schematic illustration of one exemplary hand-held printing apparatus according to a second embodiment of the present invention;

FIG. 9 is an exemplary illustration of printed paper pixel image map according to another embodiment of the present invention.

Figure 1:
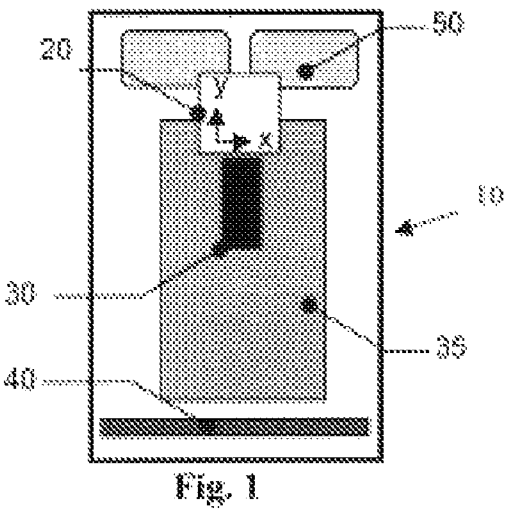
FIG. 1 is a schematic illustration of an exemplary hand-held printing apparatus according to a first embodiment of the present invention.

The embodiments set forth in the drawings are illustrative in nature and not intended to be limiting of the invention defined by the claims. Moreover, the individual features of the drawings and the invention will be more fully apparent and understood in view of the detailed description.

DETAIL DESCRIPTION OF THE INVENTION

Reference will not be made in detail to various embodiments which are illustrated in the accompanying drawings, wherein like numerals indicate similar elements throughout the views.

One embodiment of a hand-held printing apparatus of the present invention is illustrated in FIG. 1. The hand-held printer 10 comprises one or more sensors 20, a printhead 30, an ink reservoir 35 capable of containing ink, a controller 40 and a power source 50. The one or more sensors 20 are configured to provide the controller 40 data to allow calculation of either relative or absolute position of the printhead 30 with respect to the print media. The embodiment illustrated in FIG. 1 has one image sensor 20. Another embodiment of the present invention is illustrated in FIG. 7, wherein the hand-held printing apparatus 10 has two image sensors 20.

In one exemplary embodiment of the present invention, the hand-held printer 10 comprises an optical encoder sensor. The optical encoder sensor is adapted to measure speed and distance across a page. In one exemplary embodiment, the optical encoder sensor comprises a charge-coupled device (CCD) camera image sensor that compares consecutive frames against one another to determine X and Y movement. CCD camera image sensors are well known to those skilled in the art.

The hand-held printer 10 comprises one or two CCD camera sensors 20 to navigate down the page much like a typical optical mouse. For instance, the image sensor may incorporate a small CCD of 16×16 pixels, one or more lenses and a processing unit to measure X and Y position. In another embodiment, multiple CCDs may be utilized.

In order to satisfactorily print, a handheld printer benefits from a sensor or other device to determine the position of the print element relative to the paper. In one embodiment, this sensor comprises one or more conventional optical sensors such as CD camera sensors.

Figure 2:
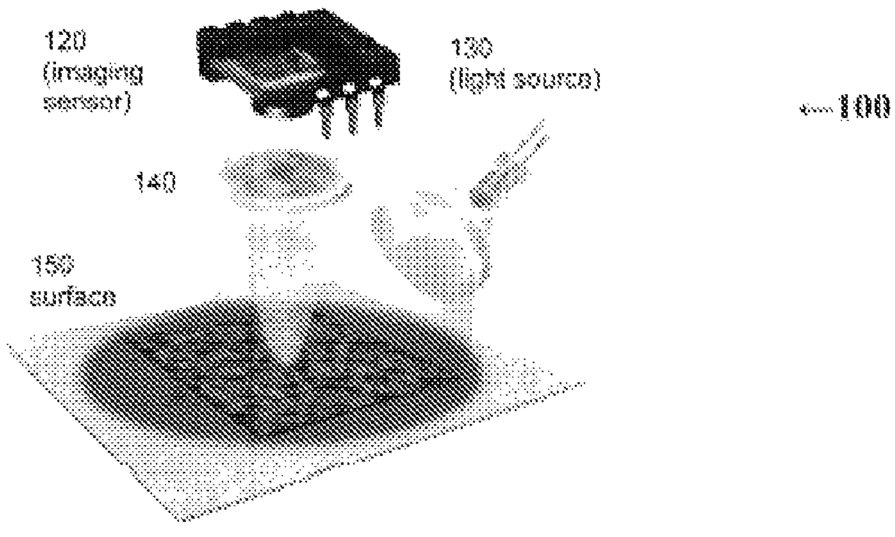
FIG. 2 is a schematic illustration of an exemplary CCD image sensor according to one embodiment of the present invention.

An exemplary CD image sensor system 100 is illustrated in FIG. 2. The CCD image sensor system 100 typically comprises a CCD image sensor 120, an LED light source 130 and a lens 140. The LED light source 130 performs two functions. First, the LED light source 130 illuminates the target media 150 so the sensor 120 can detect light and dark regions. Second, the LED light source 130 is typically angled so that grains in the paper produce small shadows. In one exemplary embodiment, high resolution image sensors may use lasers for optimum contrast on the paper.

Figure 3:
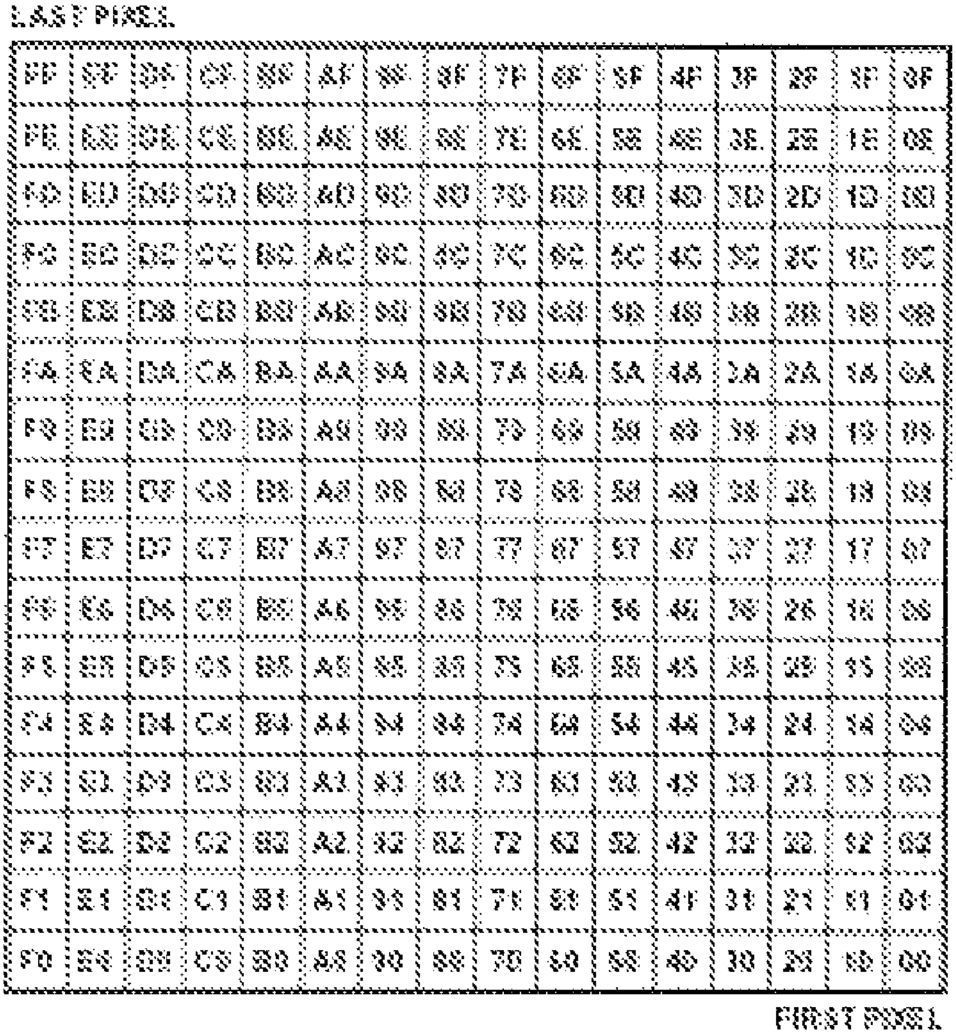
FIG. 3 is an exemplary pixel map from an optical sensor according to another embodiment of the present invention.

The CCD sensors generate individual pixel values for the detected light. Individual pixel values can be downloaded for a particular frame at a particular point in time. FIG. 3 illustrates an exemplary mapping of pixel values to memory locations for a 16×16 pixel CCD. From a pixel dump, a snap shot can be taken of what the sensor detected over a particular region, the CCD acts like a digital camera where each pixel value correlate to the amount of light reflecting from the surface at a particular point.

Since the CCD sensor can detect dark and light regions, the pixel data differs dramatically for white paper compared to a dark printed region as shown in corresponding image maps. FIG. 4 is an exemplary illustration of a hand-held printer traveling over white paper versus FIG. 5 traveling on a printed region of the paper for one frame. Typically, a CCD sensor records the average and maximum pixel values in the frame and can also output this value. It has been found that white paper typically correlates to about 32 ADC (analog-to-digital converter) units whereas dark regions created from firing ink on the page relate to ADC values in the teens with most CCD sensors. As such, comparison of ADC values can be utilized to detect ink dot locations on a printed page.

Dots on the paper can be measured by observing dark pixels. FIG. 9 illustrates that a CCD image sensor moving over a group of lines at 8 lines per mm (200 dpi) can detect geometry and can measure the geometry. Therefore, by tracking the position of the image sensor, the location of print targets can be found.

In one exemplary embodiment, the sensor comprises an electronic shutter to compensate for brightness differences. This is similar to shutter speed on a conventional camera. The sensor encoder reads average pixel values, and/or maximum pixel values and then attempts to boost or dim the light hitting the sensor accordingly. For example, the shutter can return to a predetermined calibrated level from measuring light/dark regions and grain differences, and then the shutter speed can be optimized for optimal tracking over the surfaces. In one exemplary embodiment, the shutter can be switched within the printed page or just at the beginning of the page.

With one or more CCD image sensor which can detect light versus dark grains versus no grains in print media, the CCD image sensor can be utilized to perform additional print quality features. These additional features can be categorized in three main categories: 1) sensing non-printing elements, 2) sensing pre-printed elements, and 3) sensing print elements. Each of these additional functions will be explained in more detail below.

I. Non-Printing Element (Media Type Element)

The type of media for the print out can be very important to know for several reasons which include color tables, ink saturation, dry time, navigation tracking, and print quality. The roughness of the paper will dictate the amount of ink to spray on the paper. Colors can bleed on plain paper using excess ink. However, photo paper uses different color tables than the rest.

In one embodiment of the present invention, the image sensor looks at the paper itself and not any printed features on the paper. Given the fact that the gap between the sensor and paper can be controlled, the media type can be calculated by utilizing the pixel values of the CCD and a predetermined shutter speed.

Figure 6A:
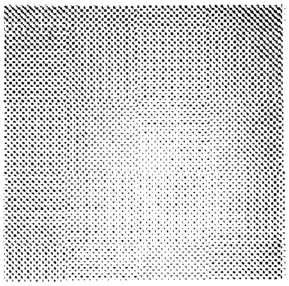
FIGS. 6A and 6B are exemplary pixel image maps according to one embodiment of the present invention.
Figure 6B:
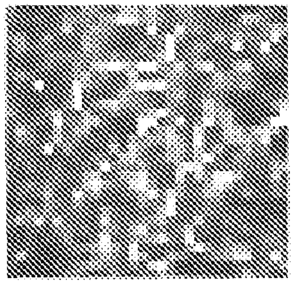

For instance, glossy paper typically has a higher reflectance value which not only causes the average pixel value to be higher (typically around 50 ADC units), but also results in the difference from pixel to pixel to be diminished. FIGS. 6A and B illustrate exemplary pixel image maps generated by a CCD image sensor moving over glossy paper portion (6A) versus grainy paper (6B). As can be noted from the images, there is distinct difference in grain between the two media that can be detected by the CCD image sensors.

In one exemplary embodiment, the shutter speed is set to a predetermined calibration level, calibrated either in the factory or during an active calibration routine. At this level, the average pixel value can be directly correlated with a specific media type. For instance, an average pixel level of 20 and 50 correlates to plain and photo paper respectively for a given shutter speed. It might take several different shutter speeds to calculate the appropriate media type in order to cover the possible range of values without reaching saturation points of the sensor. For instance, cardboard may produce a pixel level well below the optimal pixel level and the shutter speed typically needs to change. The combination of shutter speed and average pixel level allows the printer to detect the correct media type.

In another exemplary embodiment, measuring the difference between light and dark regions can help determine the grain level of the media. For instance, the difference between the maximum and minimum pixel values relate to the variability of grain level and held differentiate a low sheen photo paper from a bright white piece of plain paper as the photo paper will have very little variability across the page.

In yet another exemplary embodiment, after the media detection is finished, the shutter speed can be optimized for optimal tracking over the media surface. In other words, the CCD sensor parameters change from the factory presets for media detection to an automatic normal mode. In one exemplary embodiment, the shutter parameters can be switched within the printed page or just at the beginning of the page. Media tests usually work best as static tests where measurements are taken during a fixed short time without moving the printer on the paper. Also, the active calibration can be performed in a similar manner. In this embodiment, the printer would calibrate over some known media strip in the maintenance station.

In one exemplary embodiment of the present invention, the method comprises the steps of: collecting a first pixel map using a predetermined specified medium shutter speed; collecting additional pixel maps, wherein the frame rate is adjusted in small increments to compensate for slight hue shifts from pure white; and collecting additional pixel maps, wherein the shutter speed is ramped up and down until the average pixel value is at optimal range. Note that the shutter speed directly corresponds to the reflectivity of the surface. If the shutter speed is higher than a specified cutoff threshold calibrated from the factory then assume high sheen or photo paper. If the shutter speed is lower than the specified cutoff, then the shutter speed is set to optimal shutter speed and grain variability is examined to verify plain paper vs. rougher paper. The grain variability comes from the standard deviation of pixel values. In most cases, the consistent difference between the maximum and minimum pixel values will suffice and is much easier to calculate.

In one exemplary embodiment, if shutter speed is lower than a lower specified cutoff threshold, then printer logic assumes colored paper and either asks the user about color or tries to detect it. The hue of the paper can change the color tables.

II. Pre-Printed Elements (Start of Print Trigger)

One of the biggest challenges with hand printers from a usability point of view is that the print head is at the center of the large printer body. The top and sides of the printer prevent the user from seeing where the print head is on the page. For instance, when a user prints a signature into a box on a piece of paper, the user must guess where the print head is positioned on the page before they hit the print button. Since the navigation sensor comprises of a CCD, this sensor can actually detect pre-printed elements on the page. In this embodiment of the present invention, pre-printed elements on the page are detected, and the printer uses this information to start printing. The preprinted elements become start triggers for printing.

In one exemplary embodiment, the user starts scanning the page and the image sensor discovers the normal white values of the page. When darker elements are seen, the printer tires to perform matching against a set of predefined patterns to find any pre-printed elements. Illustrative examples of predefined patterns can include a line, a box, an oval and a checkbox. If there is a match, the element is considered a start print target. The distance from the start print target to the print head is calculated, then printing initiates at the correct location.

This embodiment differs from the previous embodiment (media type selection) as it looks at elements on the page while moving. In one particular embodiment, there is one automatic mode to detect printed features that puts no emphasis on position navigation, and a second automatic mode for measuring position that does not take into account printed elements.

In one exemplary embodiment, the method comprises the steps to set up a start of printing trigger/target using preprinted features on a print media sampling the print media using the one or more optical sensors for a predetermined time to establish a base level for the print media; decreasing the shutter speed of one or more optical sensors, wherein the decreased shutter speed is configured to raise each pixel's signal and raise shadow levels on the print media. Wherein, if the shadows are detected, the signal from the sensor is manipulated to decrease contrast, so that black printed objects are not confused with shadows. Once the proper range is found, it is set constant until start of printing wherein simple pattern matching is performed to detect the target. If any pre-printed objects are found, simple pattern matching is performed to detect the target by looking for black grouped pixels that are under some pixel threshold. The target must also register for a certain amount of movement so printed features are not confused with shadows.

In a further exemplary embodiment, once the target is identified, a position from target to print head is established and the sensor's shutter speed and frame speed is set to automatic mode for optimal navigation control over the surface instead of finding printed features. Position can be lost up to the start of printing since the goal is to find the target that triggers printing. In one exemplary embodiment, the printer switches from target detection mode to navigation mode once the target or print start trigger is found. At the desired location, printing starts. This is based on measuring where the start of printing target is located and knowing the distance between the CCD and print head.

In one exemplary embodiment, if the printer circles around one spot without finding the target, the contrast is increased so the printed areas register as being darker. This helps to correct for unregistered targets.

In an alternative exemplary embodiment, the minimum and maximum pixel values can be utilized to set the shutter speed range. In this embodiment, a majority of the target is crossed while taking measurements. The maximum pixel values will correspond to the target and readjusting the shutter speed will spread the sensitivity range so the target has more edge clarity.

III. Post Printed Elements

3.1 Swath Alignment

In normal operation, the user will quickly move the printer back and forth across the page. Due to the natural errors with hand movements, the user will not perfectly overlap printed swaths. This leads to either leaving voids in the picture in the case of not overlapping swaths enough, or in the opposite case, the swaths overlap too much, either of which leads to inefficient printing. The position sensor for the hand printer constantly computes a change in position based on surface features. Experimental tests have been shown that this type of encoder has drift where the calculated position can diverge away from the actual position. Therefore position error can grow as the printer transverses the page.

An aspect of the present invention in accordance with some embodiments includes a method to correct drift in print position. One way to correct for a drift in position is to reset measured position based on the previously printed swaths. In one particular embodiment, a CCD position sensor is disposed on either side of a print head in order to measure x,y, and yaw. The CCD sensor can be oriented such that it can detect any printed elements on the page that the print head will travel over. For example, if the sensor is aligned so the top of it is at the same height of the print head, then what ever black was detected in the sensor'page, the algorithm would know where the last swath is located and start printing immediately below it, such that the upper and lower swaths print without a gap between them. Affectively, the algorithm aligns the new swath right against the last swath printed. Having a sensor on each of two sides of a print head allows one sensor to monitor the page before the present swath is printed regardless of the direction of travel. In other words, one sensor examines the previously printed swath and the second sensor determines the placement of the to-be-printed swath.

One exemplary embodiment for aligning print swaths is to perform a vertical position reset when the previous swath is located. There might be some sort of delay so the old swath can only reset position in the middle of the page and not in the margin. Another exemplary embodiment emphasizes aligning adjacent swaths and puts less emphasis on position of the printer. This uses the fact that banding is easier to spot than an overlap shift in the picture. So even if the swaths are not parallel over the page, gaps are minimized.

Another exemplary embodiment of the present invention has a second CCD image sensor that is configured to perform additional functionality, such as monitoring a newly printed swath, verifying that adjacent swaths are aligned correctly, and/or making additional correction factors to the aligning algorithm. For example, if the previously printed swath overlapped the theoretical position of the print head by 3 pels, but the resulting printed swath after a position reset created a void of one pel as detected by the second CCD, then the theoretical position of the print head is shifted to compensate. Overlapping swaths by too much is generally preferable in terms of print quality to gaps or bands between printed swaths. Fortunately, the CCD sensors are adept at detecting the presence of banding.

Yet another exemplary embodiment of the invention involves switching sensor parameters. This embodiment varies from the previous embodiments, as it focuses on post printed objects. In this embodiment, the position sensor parameters are kept static for optimal navigation. When previously printed swaths are not detected, the printer functions normally, so there are no provisions accorded for changing the sensor parameters to detect printed elements.

In one exemplary embodiment, four conditions should be satisfied for optimally detecting a previously printed swath.

First, the previously printed swath should be sufficiently dense to be detectable by the sensor. The coverage of ink droplets on the page should be sufficiently dark that the sensor can differentiate printed swaths from sporadic shadows. If the coverage is not dark enough, the CCD will ignore any detected printed elements, treating them as low density regions that would otherwise confuse the identifying process. Printed elements that are isolated will typically not be used for target acquisition. Small objects and light parts in an image typically do not have sufficient ink on the page to be used in the alignment process.

Second, the previously printed swaths should be located in a predicted location within a predetermined tolerance. In this example, printed elements that are missing from an anticipated location of a previously printed swath are ignored to some degree. Because print elements reset the position, it is not unusual that some print elements can be several pels off of a predicted location. But if the error exceeds a predetermined tolerance, the process assumes an error has occurred, such as, for example, that the sensor is examining an incorrect set of printed elements, and the alignment is not changed.

Third, wet ink drops can appear different than drop ink drops. For instance, wet ink drops may have more shine than drop drops. Also, some wet drops have a different spectrum response than dry dots. With this in mine, detecting a previously printed swath may have to wait until reaching a dry part of the swath. This delay can be set based on experimental findings under different environmental conditions. The delay can be set at the factory.

Fourth, discontinuities should be avoided when resetting position. For instance, resetting position may not be allowed at the beginning or ending of swaths where a change in direction causes navigation errors. Also, the amount the position can change may be rate limited. So if the position is calculated to be 4 pels off, the algorithm would only correct the position by 2 pels, so the shift is not as noticeable.

By resetting the position based on previously printed swaths, the error grows at a smaller rate. Also, even if there is a significant error, the swaths are aligned and the position error does not affect print quality as previously stated.

Figure 8:
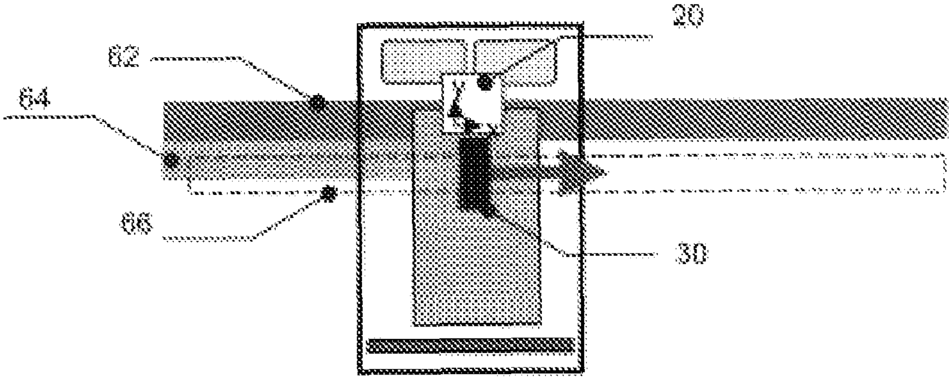
FIG. 8 is a schematic illustration of an exemplary hand-held printing apparatus according to a third embodiment of the present invention.

In one exemplary embodiment, illustrated in FIG. 8, the hand-held inkjet printer 10 has one or more optical sensors 20 and a printhead 30 comprising one or more nozzles. The method comprises jetting a first swath 62 from the printhead onto the page, wherein the jetting utilizes a first array of nozzles on the printhead 30. A first location is calculated corresponding to the first swath 62 jetted from the printhead. The edge of the first swath 62 is detected with an optical sensor 20 and the actual location corresponding to the first swath is calculated. A swath alignment correction factor is determined by comparing the detected actual location of the jetted first swath with the calculated first location of the first swath. A second array of nozzles on the printhead is selected to jet the second swath 64, wherein the selection is based at least in part on the swath alignment correction factor.

In one particular exemplary embodiment, the steps for detecting and aligning the swath comprise: scanning the page to find previously printed swaths after at least one swath has been printed, wherein if a previously printed swath is detected, analyzing the validity of the swath determination. And wherein if the validity is satisfactory, reset the position based on the discovered previously printed swath. In the case where the printed elements are found then the four conditions above are applied to compute the validity of the swath. If the conditions are passed, then the position is reset based on the discovered printed elements.

3.2 Nozzle Detection

Yet another embodiment of the present invention comprises nozzle detection. One of the biggest factors behind print quality includes if the printer is working properly. If nozzles are clogged or the water in the ink evaporates at the nozzles, the printout will be noticeably streaked. Typically, a hand held printer does not perform automatic maintenance in the same way as a normal printer, so the change of nozzles problems is dramatically increased since the user is responsible for maintenance. For example, the user may never perform maintenance and just blame poor print quality on the printer. However, the CCD position sensor can monitor printed elements on the page. If the sensor sees a lack of printed dots on the paper during printing, the printer can alert the user than maintenance needs to be performed. Dot counting and other methods can detect an out of ink condition and therefore streaking after start of life or before the ink is out can be attributed to a lack of maintenance.

One exemplary embodiment of the present invention is to measure coverage of the printing. Due to small window of visibility with the present CCD, only a limited number of nozzles can be observed. Also, due to limitations in a CCD sensor's capacity to accurately detect wet ink, the measurement for success has more to do with percentage covered than which nozzles have fired. In other words, if the paper is only 25% covered where it should be 100%, this would imply that one or more nozzles have dried up or are malfunctioning due to improper maintenance. The printer could then suggest to the user to perform maintenance.

A larger field of view CCD sensor can see more of the printed page and therefore can verify more nozzles. Given a large field of view and the fact that the resolution of the CCD's pixels are smaller than the size of a drop, the printer could actually detect individual fires of each nozzles. Therefore, it can detect which nozzle is firing properly, and how the droplet is forming on the page. In some embodiments, the printer can compute how many adjacent nozzles are not firing which can cause noticeable print defects and alert of the user in such a case. In other embodiments, print head parameters, such as the fire pulse length or pre-fire, can be adjusted to optimize ink firing on a nozzle by nozzle basis.

One potential challenge with detecting newly printed or wet ink is that the ink can reflect the light source like a mirror in small areas. Therefore, the sensor might see a dark spot turn bright for a split second. In order to compensate for this affect, the sensor can either track the same location on the page for several frames or the printer can perform some method of pattern matching. IN the latter case, the sensor looks for groups of pixels and tries to compute the size of the pattern. If the shape is large with a few highlights, then the printer assumes the print head is working properly. If the pattern is small with just dark speckles then the print head needs to be maintained and the printer can send the user a signal for printer maintenance.

In terms of position sensor parameters, there is typically a tradeoff between navigation and detection. The printer must not get lost in terms of position, but also needs to detect dark regions. For this to happen, the sensor needs to increase the contrast on the pixel data going to the navigation unit while at the same time keeping contrast low for pixel data going to pattern tracking. IN one exemplary embodiment, the shutter speed/frame rate are selected based on seeing the printed features not navigation. In other words, operating conditions would be tolerable for navigation so changing the shutter speed to see the printed features must be within tolerable ranges based on surface characteristics of the page and experimental data. In the case where two sensors are utilized, one sensor can look for printed features while the other sensor keeps accurate position, and both can use unique settings optimized for their function. The amount of movement required to take measurements is small, so while position is important, yaw effects can be a lesser focus and only one sensor is needed.

Yet another embodiment of the present invention relates to the function that checks nozzle fires. If printing a nearly fully swath, the sensor can naturally detect the dot coverage on the paper. But in order to maintain proper position and yaw angle, the nozzle check function should be performed during an initial printing step. For instance, the printer might print a full swath for a fraction of inch at the top of each print out in order to start the print head and detect proper firing of the nozzles. For example, the printer can print a dark strip on a piece of paper for maintenance. This would be an optimal time to detect nozzle coverage.

3.3 Post Printed Elements (VO/Bidi Alignment)

It is known that each individual print head can have slight differences from each other. For instance, given the same first pulse, some print heads will produce dark lines while others may not even fire at all. Also, the print head may not be perfectly aligned in the printer due to mechanical tolerances. For these two reasons, normal printers perform an alignment page which computes the optimal fire pulse and bidirectional (bidi) alignment values to produce good print quality. The hand held printer needs to compute the same parameters but in a different and unique way that utilizes the position sensor.

Similar to the Velocity Optimization (VO) measurement in a normal printer, the hand printer will lay down blocks of dots at different energy levels. The CCD sensor then looks for the block with the proper intensity. The main difference is that the CCD has to recalibrate itself to detect the printed regions of the printout and not change once set until it needs to start a print job in which navigation is more important. The procedure is very similar to nozzle detection, but the sensor can not change characteristics as it is measuring specific levels. Either in the factory or in the maintenance station, the CCD sensor calibrates itself to a known value and stores this for VO detection. When the printer moves over a region of printed elements, it utilizes a known shutter speed, frame rate, and gain. Changing the firing energy of the print head will affect the drop size and velocity. Therefore, the VO measurement through the CCD must be compared to its calibrated state to calculate the optimal value. In one alternative embodiment, if the calibrated state of the CCD is not achievable due to the needs of navigation, appropriate offsets can be applied from experimental data to correlate a fire pulse with the VO measurement.

The same procedure can be preformed for bi-directional (bidi) alignment. However, the printer must see the same type of pattern from two different directions. The navigation system must work well enough to known when the CCD sensor is over the correct printed block and which direction it is traveling. For example, if the printer is traveling from left to right, the left sensor can detect where the drops have landed on the page relative to their fire time. Now the printer changes direction. The right sensor can detect where the ink drops landed in the opposite direction. By knowing the exact distance between the two sensors, the bidi alignment factor can be calculated. The distance between sensors can either be measured experimentally or mechanically controlled. This differs from the normal bidi-alignment procedure where the same block is measured from two different directions.

Furthermore, the hand printer typically does not automatically print an auto-alignment page. Either the user has to print something on a scratch piece of paper or the pattern is hid in the print out like the nozzle detection algorithm. This method does differ from previous methods since, the sensor has to detect edges not patterns. Also the sensor parameters for VO have to be pre-calibrated so the sensor can measure absolute values on the page correlating to different print densities.

The foregoing description of the various embodiments and principles of the invention has been presented for the purposes of illustration and description. It is not intended to be exhaustive or to limit the invention to the precise forms disclosed. Many alternatives, modifications and variations will be apparent to those skilled in the art. For example, some of the principles of this invention may be used in different hand-held printer printhead configurations and technology such as piezo-electric printheads, etc. Moreover, although multiple inventive concepts have been presented, such aspects need not be utilized in combination, and various combinations of inventive aspects are possible in light of the various embodiments provided above. Accordingly, the above description is intended to embrace all possible alternatives, modifications, combinations, and variations that have been discussed or suggested herein, as well as all others that fall within the principles, spirit and broad scope of the invention as defined by the claims.

What is claimed is:

1. A method for determining media type with a hand-held inkjet printer, wherein the hand-held inkjet printer has one or more optical sensors, the method comprising:

collecting a first frame of individual pixel data with the one or more optical sensors when the hand-held printer is on a page to be printed, the collecting the first frame of individual pixel data including collecting a first pixel map using a predetermined first shutter speed and a first frame rate;

by a controller, comparing the first frame of individual pixel data with one or more pixel data records to determine the media type of the page to be printed, wherein the comparing the first frame of individual pixel data further includes collecting additional pixel maps and the first frame rate is adjusted to compensate for hue shifts; and collecting still other pixel maps with the one or more optical sensors wherein the first shutter speed is ramped up and down until an average pixel value is determined by the controller to be at an optimal range.

2. The method of claim 1, further including setting the media type to high sheen or photo paper if the resulting shutter speed is higher than a predetermined threshold; and setting the shutter speed to an optimal shutter speed if the resulting shutter speed is lower than the predetermined threshold.

3. The method of claim 2, further including determining by the controller if grain variability of the page to be printed is plain paper or rougher paper when the shutter speed is said set to the optimal speed.

4. The method of claim 2, further comprising utilizing the a standard deviation of the individual pixel data from the pixel maps to determine the media type of the page to be printed.

5. The method of claim 2, wherein if the shutter speed is lower than the lowest threshold, then the paper type is set as colored paper and the user is prompted.

6. The method of claim 1, wherein the one or more pixel data records are stored in memory in the inkjet printer.

7. The method of claim 1, wherein the one or more pixel data records are stored in memory as an external host device.

* * * * *